No. 822,342.　　　　　　　　　　　　　PATENTED JUNE 5, 1906.
J. BRENZINGER.
MACHINE FOR LINING CAN COVERS.
APPLICATION FILED FEB. 11, 1903.

No. 822,342. PATENTED JUNE 5, 1906.
J. BRENZINGER.
MACHINE FOR LINING CAN COVERS.
APPLICATION FILED FEB. 11, 1903.

No. 822,342. PATENTED JUNE 5, 1906.
J. BRENZINGER.
MACHINE FOR LINING CAN COVERS.
APPLICATION FILED FEB. 11, 1903.

No. 822,342. PATENTED JUNE 5, 1906.
J. BRENZINGER.
MACHINE FOR LINING CAN COVERS.
APPLICATION FILED FEB. 11, 1903.

Witnesses:
Jos. H. Blackwood
Warner G. Ogden

Inventor
Julius Brenzinger
W. H. Doolittle & Son
Attorneys

UNITED STATES PATENT OFFICE.

JULIUS BRENZINGER, OF NEW YORK, N. Y., ASSIGNOR TO THE MAX AMS MACHINE COMPANY, OF NEW YORK, N. Y., A CORPORATION OF NEW YORK.

MACHINE FOR LINING CAN-COVERS.

No. 822,342.     Specification of Letters Patent.     Patented June 5, 1906.

Application filed February 11, 1903. Serial No. 142,897.

*To all whom it may concern:*

Be it known that I, JULIUS BRENZINGER, a subject of the German Emperor, residing at New York, in the county of New York and State of New York, have invented certain new and useful Improvements in Machines for Lining Can-Covers, of which the following is a specification.

My invention relates to machines for lining the covers of cans. This lining is applied to the inner edge of the can-cover and consists of a coating perferably of a composition that will give the coating the properties of a non-deleterious and heat-resisting seam-packing, such as will render unnecessary the use of solder to obtain a tight joint.

The object of my invention is to provide means to continuously and automatically line and discharge the covers with great rapidity.

To this end my invention is embodied in a machine shown and described in the accompanying drawings and following description, and such invention is defined in and by the claims appended thereto.

In the accompanying drawings.

Referring to the drawings, 1 is the main driving-pulley, and 2 the main shaft carrying the same. Secured on this main shaft is a gear-wheel 3, meshing with a gear-wheel 4, mounted on a shaft 5, journaled in the framework. This shaft drives a Geneva stop-movement, whereby a central shaft 6, journaled in the frame, is intermittently rotated. This Geneva stop-movement comprises a mutilated disk 7 on the shaft 5 and a pin 8 on an arm extended from the shaft. The pin is adapted to engage radial slots 9 in a wheel 10, which is also provided with curved recesses 12 to receive the circular periphery of the disk 7. The shaft 6 has a collar 13, which carries a frame 14, provided with a series of journal-bearings 15, in which are vertically journaled a series of shafts 16, provided at their upper ends with cover-carrying plates or disks 17. These plates are preferably six in number; but it is obvious that a greater or less number may be employed. A revolving carrier-frame is thus formed. In the upper surface of the plates 17 are formed circular grooves 18, adapted to receive the flanged edge of a can-cover. At their ends the shafts 16 are provided with rollers 19, fixed thereto and by means of which said shafts are intermittently rotated on their axes in the manner hereinafter described.

In the revolution of the carrier-frame the rollers 19 of the carrier-shafts are successively brought in contact with a continuously-driven belt 20, running tangentially to the circular path of the revolving carrier-rolls. This belt is mounted on rollers 21, one of which is fixed to and driven by main shaft 2 and the other fixed on an idle shaft 22. By means of their contact with this belt the rollers 19, and consequently their shafts, are each successively rotated on their axes during the period of their pressure against the belt.

Figure 7:
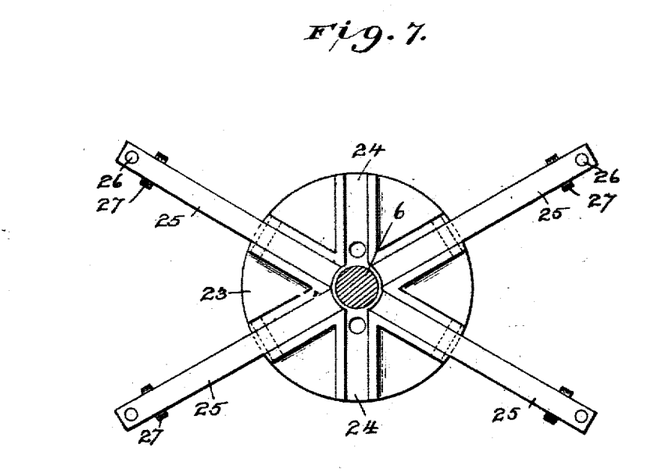
Fig. 7, a detail plan of the center of the rotatable carrier-frame, showing clamping-levers with two of the laths removed.
Figure 8:
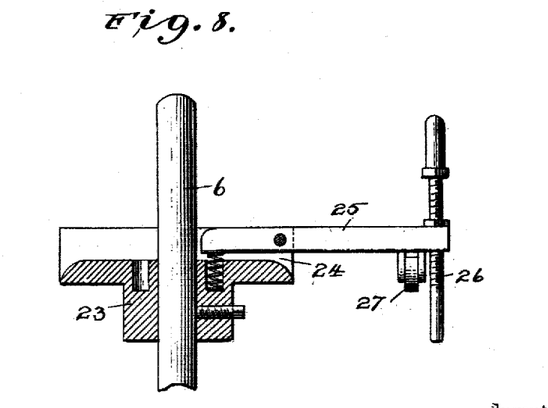
Fig. 8, a central section detail of one of the clamping-levers.
Figure 9:
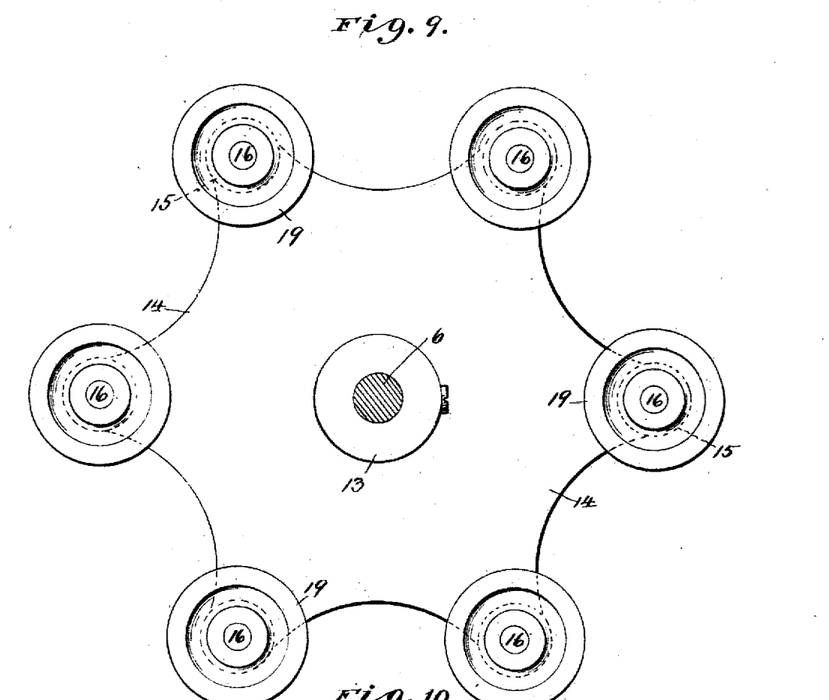
Fig. 9, a bottom plan looking up toward bottom of carrier-frame.

Near its upper end the shaft 6 is provided with a spider-frame 23, having radial slots 24, in which are pivoted levers 25, each extending forward over a carrier-plate and provided with a vertical adjustable rod 26 at its outer end, which rod rests directly over the center of the carrier-plate. The longer arm of the lever is toward the outer end, and hence the lever will have a normal tendency to depress the rod and to hold it against the carrier-plate. Near its outer end each lever is provided with a roller 27. These rollers are adapted to ride on a rail 28 for a portion of their travel, whereby they are raised from the carrier-plates. The rail is inclined at one end to permit the roller to easily ride up thereupon. The rods 26 serve to hold the can-covers on the plates, and they are raised and lowered to release or clamp the covers by the action of the levers, rolls, and rail just described.

Figure 1:
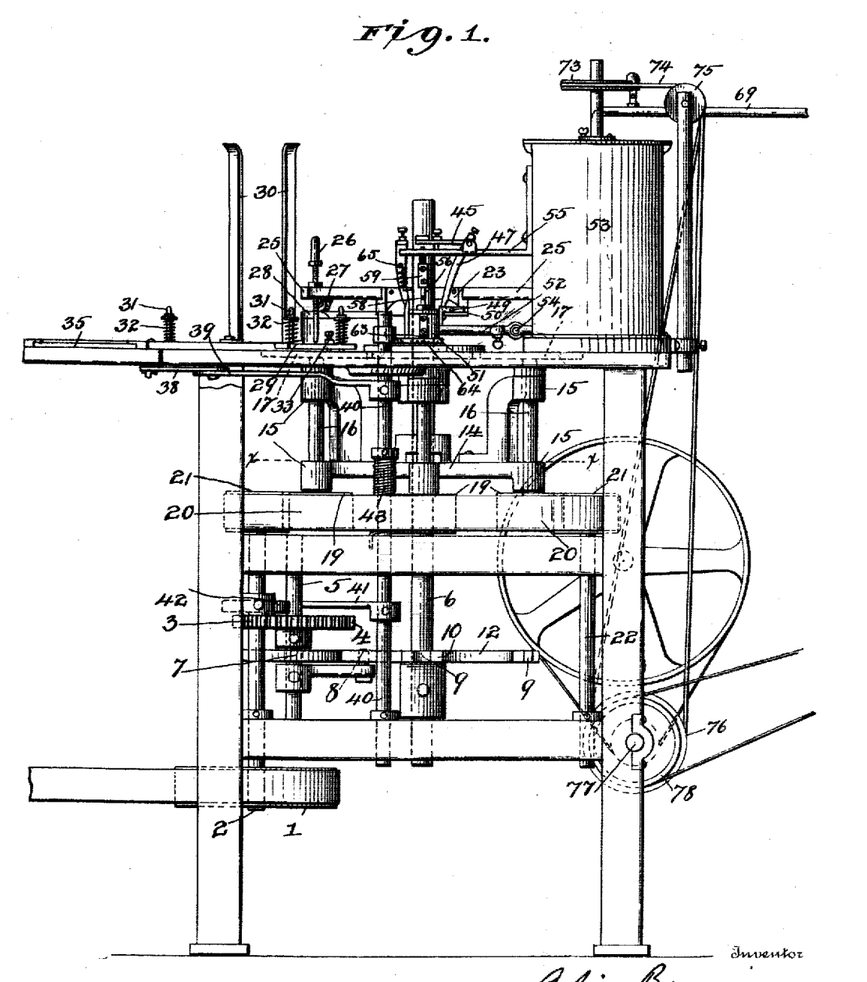
Figure 1 is a side view in elevation of the entire machine.
Figure 2:
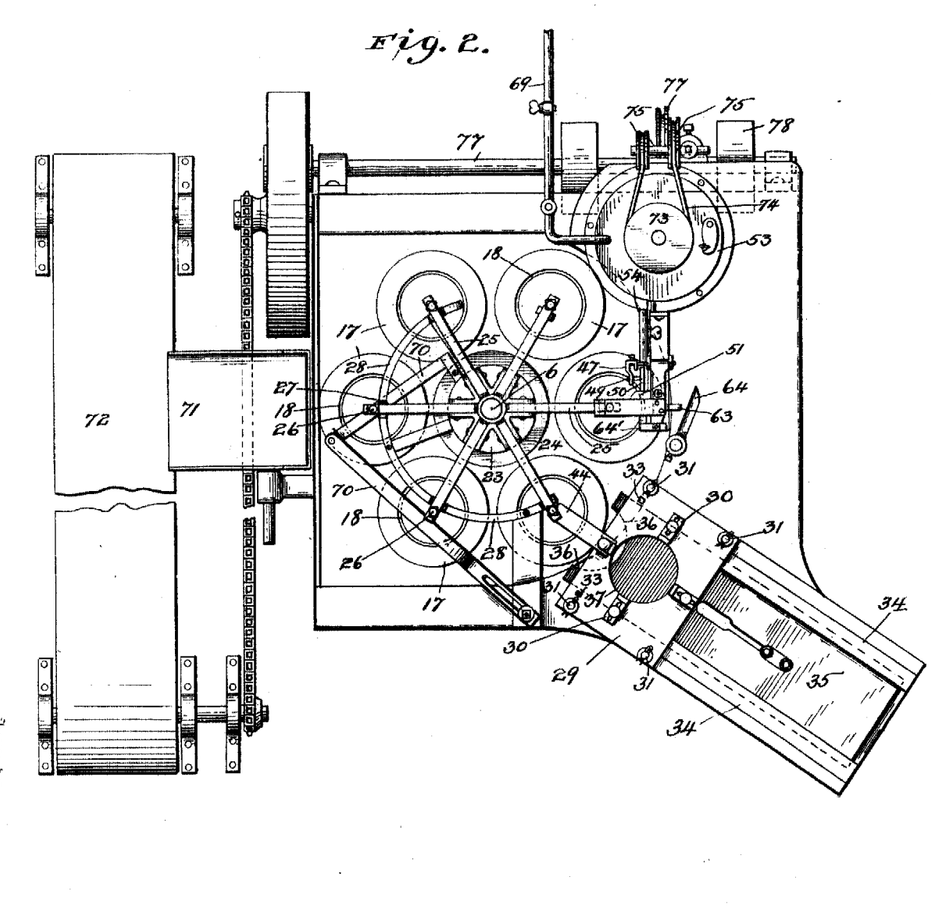
Fig. 2, a top plan view.
Figure 3:
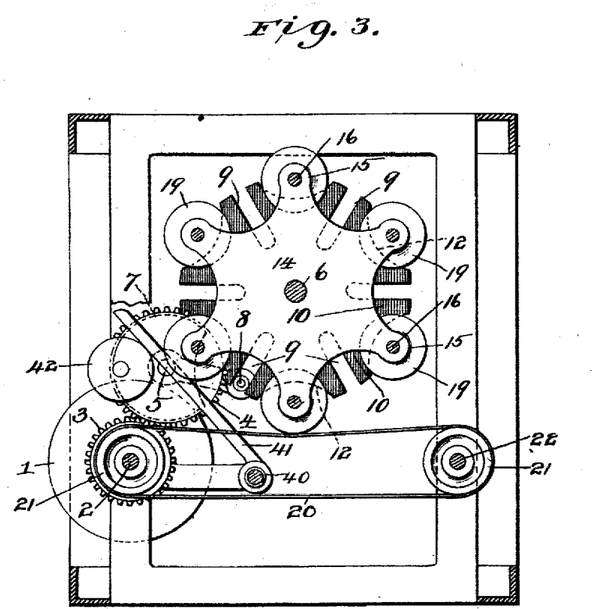
Fig. 3, a horizontal section on the line x x of Fig. 1.
Figure 4:
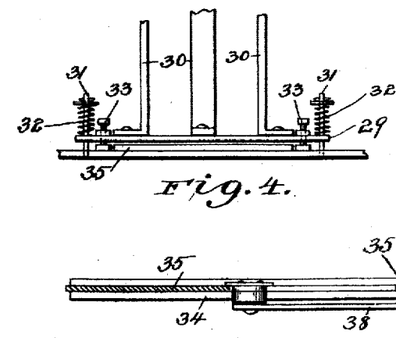
Fig. 4, a detail edge view of the bottom of the feed-receptacle.
Figure 5:
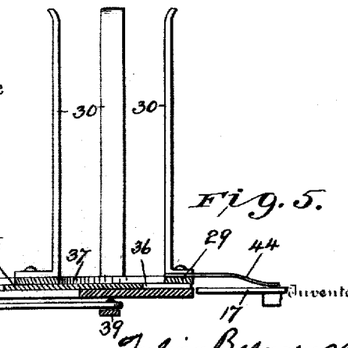
Fig. 5, a side view, partly in section, of feed-plunger, guideway, and feed-receptacle.
Figure 6:
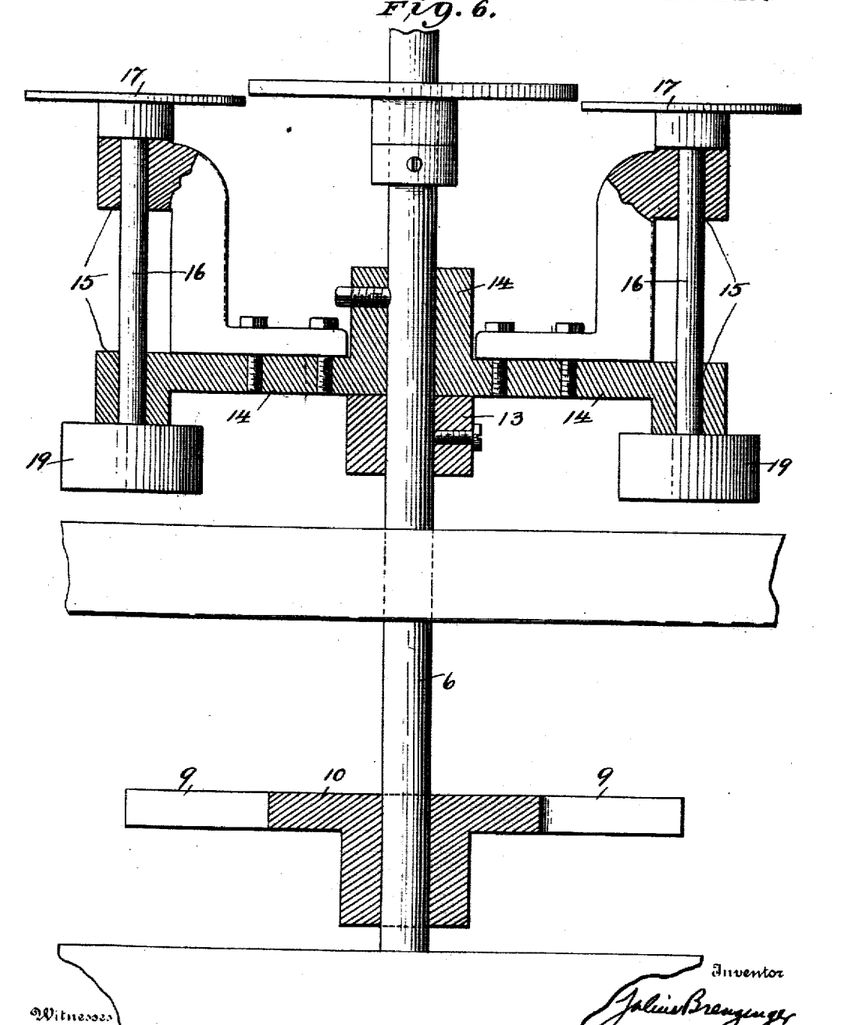
Fig. 6, a detail view, broken away and partly in section, of the rotating cover-carrier frame.

Secured to a plate 29, mounted on the framework, is a can-cover receptacle formed of vertical arms 30. The plate 29 is mounted on the framework, so as to yield in an upward direction, by means of studs 31, on which the plate can slide, and which studs are surrounded by coiled springs 32, bearing on the plate. The plate is held from contact with the framework by adjustable screwbolts 33, extending through the plate. Extending rearwardly on the frame behind the plate 29 are guide-rails 34, between which is adapted to fit and slide a feed-plate 35, having a curved front edge 36 conforming to the curve of the center of a feed-aperture 37 in the plate 29. The space between the plate 29 and framework is just sufficient to permit a single can-cover to be fed down through the plate so that its edge will clear the plate when the reciprocating feed-plate is carried forward. When the cover is forced under the plate 29, the latter will yield against its springs to permit the thicker portion of the central part of the cover to be forced between the plate and frame.

The slide-plate 35 has an arm 38 on its under surface, which arm is pivoted at its inner end to a connecting-bar 39, secured to a shaft 40, journaled in the frame, which is actuated by a lever 41, fixed to the shaft and having a free end extending across the path of movement of a circular wheel or disk 42, eccentrically and loosely mounted on the gear-wheel 3. The connecting-bar 39 is provided with a return-spring 43, which serves to carry back the rod and lever to normal position after they have been operated by the eccentric disk and lever.

The can-cover is fed from the receptacle to a carrier-plate by the reciprocating feed-plate under and against the pressure of a spring-finger 44, secured to the plate 29, so that the cover will be held in the carrier-plate until engaged by the clamping-rod.

On the main frame is mounted the composition-applying mechanism, consisting of a tank, feeding means, and controlling means.

Figure 11:
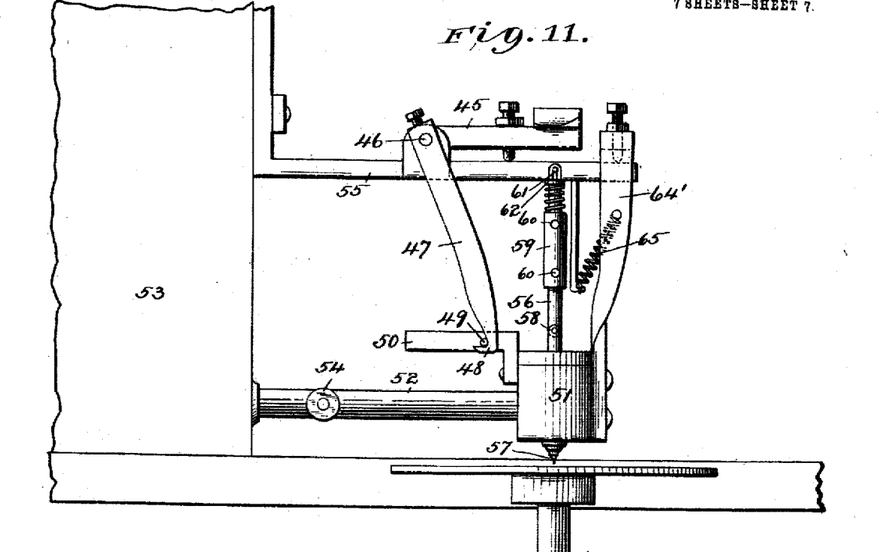
Fig. 11, a side elevation of the composition-controlling-valve mechanism.
Figure 12:
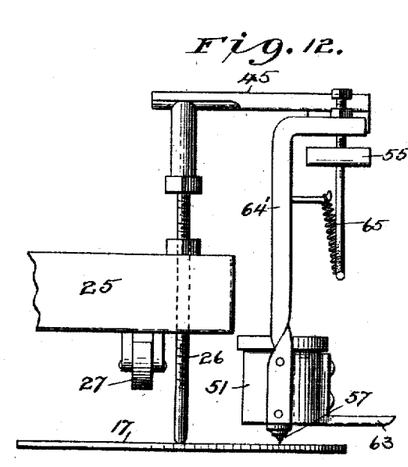
Fig. 12, a front view of such mechanism, and Fig. 13 a central vertical section through the valve-box.
Figure 13:
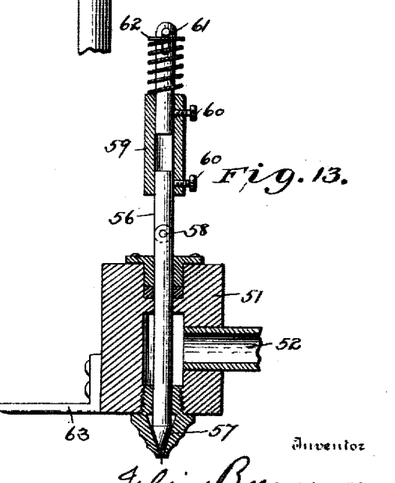

A pivoted right-angled arm 45 extends into the line of movement of the clamping-rods. When a can-cover is pushed under a clamping-rod, the latter will be raised a sufficient height to come in contact with the arm 45 and raise the same. The arm is provided with a rocking shaft 46, which carries a depending arm 47, having a hook 48 at its lower end which is adapted to engage a pin 49, projecting from an arm 50, secured to a controlling-valve box 51, which is mounted on a pipe 52, connected to the composition-holding tank 53 by a rocking joint at 54. The tank 53 also supports a bar 55, on which the lever 45 is pivoted. Within the box 51 extends a plunger 56, on which the box is slidable. This plunger is provided at its lower end with a needle-valve 57, adapted to open and close the lower open end of the valve-box when the latter is vertically reciprocated. At its upper part the plunger is divided and the two parts connected by a coupling-sleeve 59, through which passes set-screws 60 to permit of the vertical adjustment of the plunger and its valve, whereby the extent of the opening, and consequently the amount of feed of the composition through the box, may be set at any desired degree. The plunger has at its upper extremities a slot-and-pin connection 61 with a pin projecting from the bar 55, and a coiled spring is confined between the upper end of the sleeves 59 and a washer 62, whereby the plunger is permitted a slight yielding movement in order to enable the covers to readily slip under the same. The plunger is jointed at 58 to permit of a slight yielding movement thereof to accommodate the arc-shaped movement of the box. The valve-box is normally held closed by the engagement of the pin on its supporting-arm with the hook 48 of the depending arm 47.

The valve-box 51 of the supporting-pipe 52 is provided with a projection or lug 63, with which is adapted to make contact a swinging arm 64, mounted on the end of the vertical shaft 40, so that when said shaft is returned by its spring the arm 64 will strike the lug 63 and raise the rocking box-supporting pipe until the pin 49 of the latter engages the hook 48, whereupon the valve-box will be closed by its valve and the escape of the composition cut off. Connected to the bar 55 and to an arm 64', rising from the valve-box, is a coiled spring 65, the action of which is to throw the box downward when the latter is released from the hook.

Figure 10:
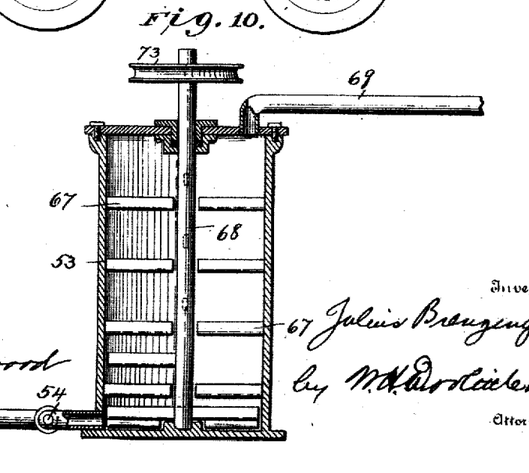
Fig. 10, a central vertical section of the composition-tank.

The tank 53 is adapted to contain a suitable lining composition. This composition is kept well mixed and in a fluid condition by means of a mixer consisting of fixed mixer-blades 67 and a dasher 68, provided with similar blades.

To the tank is connected at the upper end a suitable valve-controlled air-inlet pipe 69, through which compressed air is adapted to be forced in order to force the composition from the tank through the outlet-pipe 52 to the controlling-valve box.

Secured to the main frame and to the rail 28 is a stop-bar 70, extending above and across the line of travel of the carrier-plates toward a discharge-chute 71. The lined covers strike against this bar and are guided thereby down into the chute 71, which leads to an endless conveyer 72, by which the covers are carried to a suitable drier to fix the composition.

The shaft of the mixing-tank dasher is provided near its upper end with a pulley 73, which is driven by a belt 74, running over guide-pulleys 75 and driven by a pulley 76 on a shaft 77, which is provided with a drive-pulley 78, connected to any suitable source of power.

The operation of the machine is as follows: Can-covers of any desired number are placed in the vertical receptacle 30. When the sliding feed-plunger 35 is withdrawn to its uttermost position, there will be just enough space between the plate 29 and the frame to permit the edge of a cover to pass through the circular aperture 37 down upon the frame; but the higher central portion of the cover will prevent the same from slipping out of position until the feed-plate is forced forward to engage and push the plate from under the receptacle. The machine then being driven through the main shaft 2, the central shaft 6 will be rotated by its Geneva stop-movement connection with said main shaft, so as to rotate the carrier-frame and carry each carrier-plate 17 successively around in line with the feed-plunger guide-track 34. As a carrier-plate comes into register with the feed-plunger track the pin 8 of the Geneva stop-movement will pass out of engagement with the slot in the star-wheel 10, so as to cease actuation of the wheel, and the curved recesses 12 of the latter will then be engaged by the curved periphery of the mutilated disk 7, so as to stop and hold said wheel, whereby the carrier-plate will be held in register with the feed-plunger track until a cover is fed forward to the carrier-plate. Simultaneously with the disengagement of the star-wheel and pin and stoppage of the carrier-frame the eccentrically-mounted disk 42, carried around by the continued movement of the shaft 5, will engage and actuate the lever 41 of the shaft 40, so as to rotate the shaft and through the connecting-arms 39 and 38 carry forward the sliding feed-plunger plate 35, the front curved edge 36 of which will engage the edge of the cover and force the cover forward under and past the plate 29 to and upon the carrier-plate 17. The plate 29 will yield by reason of its springs 32 to permit the greater thickness of the central portion of the cover to pass thereunder. As the cover is carried out onto the carrier-plate it will pass under and be pressed upon by the guide spring-finger. The bent edge of the cover will fit into the groove 18 of the plate. The plunger will be returned to retracted position by the spring 43 and simultaneously will be engaged by the pin, and the carrier-frame will be revolved another step, so as to present a new carrier-plate to the feed-track. As the carrier-plate moves away from the track the roller 27 of the lever 25 runs off the end of rail 28 and permits the holding-rod 26 to descend upon the cover. The weight of the rod and lever locks the cover securely in center position on the carrier-plate. The first carrier-plate is then moved forward to the composition-applying mechanism, where the Geneva movement again stops the carrier-frame during the application of the lining, while simultaneously a succeeding carrier-plate is presented to the cover-feed track and another cover fed thereto. The holding-rod 26, bearing on the first-named cover, will be raised by the thickness of the cover sufficiently high to come in contact with the extending arm of the pivoted lever 45, and thus rock said lever on its pivot, whereby the hook 48 of the depending arm will be released from the pin 49, and the box 51 will thus be allowed to rock downward on the plunger 56, this movement being aided by the spring 65, connected to the arm 64', attached to the valve-box. The movement of of the box will withdraw its opening from the needle-valve 57 of the plunger and permit a certain quantity of composition, determined by the adjustment of the set-screws, to escape through the opening and upon the extended end portion of the plunger, which may be provided, if desired, with suitable means of applying the composition to the edge of the can. As the edge of the cover is brought into position under the plunger the roller 19 on the end of the shaft carrying the carrier-plate comes in peripheral contact with the continuously-driven endless belt 20, and by its pressure against said belt it is rotated, and with it the carrier-plate and can-cover, so that the latter is circularly wiped under the composition-applying means. The roller 19 is in contact with the belt long enough to impart two complete rotations to the carrier-plate and its cover.

The mixing mechanism may be continuously or intermittently driven to stir up the composition. The compressed air may be admitted to the tank whenever required to supply the pressure necessary to force the composition through the feed-pipe.

As the carrier-frame again takes up and continues the revolution of the carriers the rod 26 passes away from the lever 45 and permits the latter to rock back. Simultaneously the arm 64 on the shaft 40 by the return movement of said shaft is brought in contact with lug 65, so as to raise the rocking box-supporting pipe 52 and engage the pin 49 with the hook 48, so as to restore said box to its normal raised position with the valve-opening closed.

Should a carrier-plate without a can-cover thereon be driven past the composition-applying mechanism, the latter would not be operative, since the interposition of the cover between the rod 26 and the carrier-plate is necessary in order to raise the rod sufficiently to make contact with the lever 45. The roller 27 then engages the inclined end of the rail 28 and rides upon said rail, so as to lift the lever 25 and raise the rod 26 from the cover. When the carrier-plate passes under the stop-guide bar 70, the cover will strike against the latter and be pushed off thereby into the cover-chute 71, from whence it will fall onto the endless conveyer 72, which carries the cover to a heater and drier.

It is clear that various changes in the details of the machine may be made without departing from the genuine principle of the leading ideas of my invention.

Having thus described my invention, what I claim is—

1. In a machine for lining can-covers, in combination with a traveling frame, means to carry a plurality of covers on said frame, means to clamp said covers to said frame, a vertical receptacle independent of said frame, in which the covers are held in a pile, a slideway leading from said receptacle to said frame, said receptacle being open at the bottom, and an intermittently-actuated slide moving past the bottom of said receptacle to automatically carry a cover to the frame and means to operate said slide, substantially as described.

2. In a machine for lining can-covers, in combination with a fixed vertical receptacle, a revolving frame movable past the fixed receptacle carrying a series of cover-receiving depressions, means to give said frame a step-by-step movement whereby each cover depression is brought opposite the receptacle successively, a slideway leading from the receptacle to said frame, a transferring mechanism for shifting a single cover from the receptacle to the frame, and means for operating said mechanism as each depression is brought opposite to slideway, substantially as described.

3. In a machine for lining can-covers, in combination with a fixed vertical receptacle for containing a pile of covers, a revolving cover-carrying frame, means to give an intermittent movement to said frame, a cover-slide member adapted to force a single cover from said receptacle to the frame, means to intermittently actuate said slide member, a fixed composition-applying mechanism maintained in the path of said frame, a series of cover depressions in said frame, means to successively present a depression to the receptacle and to the composition-applying mechanism and to stop the frame during the transfer of a cover and the application of the lining composition; a tank for said composition and means to open said tank to admit a supply to the applying mechanism at each stoppage of the frame, substantially as described.

4. In a machine for lining can-covers, in combination with a vertical, fixed receptacle adapted to contain a pile of can-covers, a revolving cover-carrying frame, a sliding plunger-plate for feeding a cover to the frame from said receptacle, a main driving-shaft, a shaft for said revolving frame, a Geneva stop-movement between said shafts, an eccentric connected to the main shaft and adapted to intermittently operate said plunger-plate and a composition-applying mechanism independent of said revolving frame, substantially as described.

5. In a machine for lining can-covers, in combination with a vertical fixed receptacle adapted to contain a pile of covers, a revolving frame, independently-rotatable separate cover-carriers on said frame, a plunger-plate for feeding the covers singly from said receptacle to said frame, means to stop the frame as each carrier is brought opposite the receptacle and means to operate said plunger-plate during such stoppage, a fixed composition-applying mechanism, means to carry said covers past said mechanism and to successively stop each carrier at the mechanism and means to rotate said carrier and to operate the composition-applying mechanism, during such stoppage, substantially as described.

6. A machine for lining can-covers having a feed-plunger, a guideway-plate, an apertured receptacle and means to permit a yielding movement between said receptacle and guideway-plate, substantially as described.

7. In a machine for lining can-covers, in combination with a revolving cover-carrying frame, a vertical fixed cover-receptacle, an apertured guide-plate forming the bottom of the receptacle, said plate yieldingly mounted, a guideway below said apertured plate, a sliding plunger-plate, means to intermittently revolve said frame, and means to operate said plunger to slide a cover forward during the stoppage of the frame, and a composition-applying mechanism, substantially as described.

8. A machine for lining can-covers having a composition-applying mechanism having a tank, a pipe leading from said tank, a cut-off valve in said pipe and means to operate said valve, substantially as described.

9. In a machine for lining can-covers, in combination with a revolving cover-carrying frame, a composition-applying mechanism, said mechanism comprising tank adapted to hold a source of supply, a pipe leading therefrom, a valve-box to which said pipe leads, a valve in said box, said valve normally inoperative except when a cover is carried past the composition mechanism, and means to open said valve by the pressure of a cover, to permit the application of the composition, substantially as described.

10. A machine for lining can-covers having a composition-applying mechanism comprising a source of supply, a controlling-valve, a pivoted hook adapted to hold said valve closed, a cover-carrier and means carried by said cover-carrier to engage said hook, substantially as described.

11. A machine for lining can-covers having a composition-applying mechanism, comprising a source of supply, a controlling-valve box, a pivoted pipe carrying said box, a pivoted hook engaging said box, a cover-carrier, a cover-clamping member adapted to release said hook, and means to restore said box into engagement with the hook, substantially as described.

12. A machine for lining can-covers having a composition-applying mechanism provided with a controlling-valve, a cover-carrier, a pivoted member carried by said carrier and adapted to be raised into position by the interposition of the cover between the carrier and said member to operate said valve, substantially as described.

13. In a machine for lining can-covers, in combination with a traveling cover-carrying frame, a fixed composition-applying mechanism, a tank adapted to contain a source of composition-supply, a stirrer in said tank, driving means for said stirrer, a pipe leading from the lower end of said tank, a valve-box to which said pipe leads, a valve in said box and means to operate said valve to open the box as a cover is presented thereto, substantially as described.

14. In a machine for lining can-covers, in combination with a cover-carrying frame, means to revolve the same, separate cover-holding devices on said frame, means to independently rotate said devices, a fixed cover-receptacle, and a cover-feed plunger and means to intermittently operate the same, a composition-applying mechanism fixed in the path of the covers, a valve controlling said mechanism, means to operate said valve as a cover is presented to said mechanism, a stop-bar extending over the frame and a discharge-chute leading from said frame to which the cover is discharged by contact with said bar, substantially as described.

In testimony whereof I have signed my name to this specification in presence of two witnesses.

JULIUS BRENZINGER.

Witnesses:
   Jos. H. Blackwood,
   H. P. Doolittle.